(12) United States Patent
Hino et al.

(10) Patent No.: US 9,547,170 B2
(45) Date of Patent: Jan. 17, 2017

(54) OPTICAL SCANNER AND IMAGE FORMING APPARATUS

(71) Applicant: Seiko Epson Corporation, Tokyo (JP)

(72) Inventors: Makiko Hino, Matsumoto (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 455 days.

(21) Appl. No.: 13/858,244

(22) Filed: Apr. 8, 2013

(65) Prior Publication Data

US 2013/0278985 A1 Oct. 24, 2013

(30) Foreign Application Priority Data

Apr. 18, 2012 (JP) ................................. 2012-095096

(51) Int. Cl.
*G02B 26/10* (2006.01)
*G02B 26/08* (2006.01)
*G02B 27/10* (2006.01)

(52) U.S. Cl.
CPC ............ *G02B 26/105* (2013.01); *G02B 26/085* (2013.01); *G02B 26/101* (2013.01); *G02B 27/104* (2013.01)

(58) Field of Classification Search
CPC ..... G02B 26/10; G02B 26/08; G02B 26/0825; G02B 26/0833; G02B 26/085; G02B 26/0841; G02B 26/0858; G02B 26/105; G02B 7/1821
USPC ................... 359/198.1–199.4, 200.6, 200.8, 221.2, 359/223.1–224.2, 226.1–226.2
See application file for complete search history.

(56) References Cited

U.S. PATENT DOCUMENTS

| 6,044,705 A * | 4/2000 | Neukermans et al. .... 73/504.02 |
| 7,529,011 B2 | 5/2009 | Fujii |
| 2010/0046052 A1* | 2/2010 | Mizoguchi ........... G02B 26/101 359/199.3 |
| 2011/0194164 A1* | 8/2011 | Chou et al. ................ 359/200.6 |
| 2011/0249020 A1* | 10/2011 | Brown ..................... G09G 3/02 345/606 |

FOREIGN PATENT DOCUMENTS

| JP | 2001-250914 A | 9/2001 |
| JP | 2004-258158 A | 9/2004 |
| JP | 2006330399 A * | 12/2006 |
| JP | 2006330399 A | 12/2006 |
| JP | 4416117 B2 | 2/2010 |

* cited by examiner

*Primary Examiner* — Bumsuk Won
*Assistant Examiner* — Ephrem Mebrahtu
(74) *Attorney, Agent, or Firm* — Harness, Dickey & Pierce, P.L.C.

(57) ABSTRACT

An optical scanner includes: a movable body that is able to oscillate around a first axis; a first shaft member that is connected to the movable body along the first axis; and a drive unit that includes a permanent magnet, a coil that generates a magnetic field by application of voltage, and a voltage applying section that applies a voltage to the coil and oscillates the movable body around the first axis, wherein the movable body includes a light reflecting plate provided with a light reflecting section having light reflectivity, a support frame that surrounds the light reflecting plate and has a thickness that is, ten times or less, larger than the thickness of the light reflecting plate, and a plurality of connecting sections that connects the light reflecting plate and the support frame at a plurality of locations.

14 Claims, 11 Drawing Sheets

FIRST VOLTAGE
(VERTICAL SCANNING DRIVE SIGNAL)

SECOND VOLTAGE
(HORIZONTAL SCANNING DRIVE SIGNAL)

OPTICAL SCANNER AND IMAGE FORMING APPARATUS

BACKGROUND

1. Technical Field

The present invention relates to an optical scanner and an image forming apparatus.

2. Related Art

For example, US-A-2011-249020 discloses an optical scanner that two-dimensionally scans light, as an optical scanner for performing image drawing by light scanning in a projector, a printer or the like.

The optical scanner disclosed in US-A-2011-249020 includes a frame-shaped member that is able to oscillate around a first axis, a movable section that is provided inside the frame-shaped member and is able to oscillate around a second axis perpendicular to the first axis, a permanent magnet, and a coil. Further, the movable section includes a light reflecting plate provided with a light reflecting section having light reflectivity, a support frame that surrounds the light reflecting plate, and a plurality of connecting sections that connects the light reflecting plate and the support frame at a plurality of locations. The coil is disposed in a frame-shaped member.

In general, when the optical scanner is driven, a so-called dynamic bending occurs in which the light reflecting plate is bent. In this regard, in the optical scanner disclosed in US-A-2011-249020, when the optical scanner is driven, the support frame is preferentially bent in the movable section, and thus, it is possible to suppress the light reflecting plate from being bent to some degree.

In the optical scanner disclosed in US-A-2011-249020, since the thickness of the light reflecting plate and the thickness of the support frame is the same, the stiffness of the support frame is insufficient, and it is thus difficult to sufficiently suppress the light reflecting plate from being bent.

SUMMARY

An advantage of some aspects of the invention is to provide an optical scanner and an image forming apparatus that are capable of sufficiently suppressing a light reflecting plate from being bent.

An aspect of the invention is directed to an optical scanner including: a movable body that is able to oscillate around a first axis; a first shaft member that is connected to an end part of the movable body in a direction along the first axis; and a drive unit that includes a permanent magnet, a coil that generates a magnetic field by application of voltage, and a voltage applying section that applies a voltage to the coil and oscillates the movable body around the first axis, wherein the movable body includes a light reflecting plate provided with a light reflecting section having light reflectivity, a support frame that surrounds the light reflecting plate and has a thickness that is, ten times or less, larger than the thickness of the light reflecting plate, and a plurality of connecting sections that connects the light reflecting plate and the support frame at a plurality of locations, and wherein as the voltage applying section applies a voltage of a predetermined frequency to the coil, the movable body oscillates around the first axis at the predetermined frequency.

According to this configuration, the stiffness of the support frame with respect to the light reflecting plate is increased, and it is thus possible to suppress the light reflecting plate from being bent in driving.

In the optical scanner according to the aspect of the invention, it is preferable that the thickness of the support frame is two times or more of the thickness of the light reflecting plate.

According to this configuration, it is possible to reliably suppress the light reflecting plate from being bent.

In the optical scanner according to the aspect of the invention, it is preferable that the support frame is configured by a stacked structure obtained by sequentially stacking a first Si layer, an $SiO_2$ layer and a second Si layer.

According to this configuration, it is possible to simply form the support frame.

In the optical scanner according to the aspect of the invention, it is preferable that the light reflecting plate has a configuration in which the light reflecting plate is provided on an Si layer.

According to this configuration, it is possible to simply form the light reflecting plate.

In the optical scanner according to the aspect of the invention, it is preferable that the movable body includes a frame-shaped member; a movable section that is provided inside the frame-shaped member, includes the light reflecting plate, the support frame and the respective connecting sections, and is able to oscillate around a second axis perpendicular to the first axis; and a second shaft member that is connected to an end part of the movable section in a direction along the second axis and connects the movable section and the frame-shaped member, wherein the first shaft member is connected to an end part of the frame-shaped member in the direction along the first axis so that the frame-shaped member is able to oscillate around the first axis, and the voltage applying section includes a first voltage generating section that generates a first voltage of a first frequency, a second voltage generating section that generates a second voltage of a second frequency different from the first frequency, and a voltage overlapping section that overlaps the first voltage and the second voltage, and as a voltage overlapped by the voltage overlapping section is applied to the coil, the movable section oscillates around the first axis at the first frequency and oscillates around the second axis at the second frequency.

According to this configuration, it is possible to oscillate the light reflecting plate around the first axis and the second axis.

In the optical scanner according to the aspect of the invention, it is preferable that the permanent magnet is disposed in the movable body.

According to this configuration, it is possible to prevent the light reflecting plate from being bent due to heat radiation of the coil.

In the optical scanner according to the aspect of the invention, it is preferable that the permanent magnet is disposed in the support frame.

According to this configuration, it is possible to reliably suppress the light reflecting plate from being bent.

In the optical scanner according to the aspect of the invention, it is preferable that the coil is disposed in the movable body.

According to this configuration, it is possible to reduce the mass of the movable body side, compared with a case where the permanent magnet is disposed in the movable body.

In the optical scanner according to the aspect of the invention, it is preferable that the coil is disposed in the support frame.

According to this configuration, it is possible to reliably suppress the light reflecting plate from being bent.

In the optical scanner according to the aspect of the invention, it is preferable that the movable body includes a frame-shaped member; a movable section that is provided inside the frame-shaped member, includes the light reflecting plate, the support frame and the respective connecting sections, and is able to oscillate around a second axis perpendicular to the first axis; and a second shaft member that is connected to an end part of the movable section in a direction along the second axis and connects the movable section and the frame-shaped member, wherein the first shaft member is connected to an end part of the frame-shaped member in the direction along the first axis so that the frame-shaped member is able to oscillate around the first axis, the coil is disposed in the frame-shaped member, and the voltage applying section includes a first voltage generating section that generates a first voltage of a first frequency, a second voltage generating section that generates a second voltage of a second frequency different from the first frequency, and a voltage overlapping section that overlaps the first voltage and the second voltage, and as a voltage overlapped by the voltage overlapping section is applied to the coil, the movable section oscillates around the first axis at the first frequency and oscillates around the second axis at the second frequency.

According to this configuration, it is possible to reduce the mass of the movable section.

Another aspect of the invention is directed to an image forming apparatus including: a light source that emits light; and an optical scanner that scans the light from the light source, wherein the optical scanner includes a movable body that is able to oscillate around an axis; a shaft member that is connected to an end part of the movable body in a direction along the axis; and a drive unit that includes a permanent magnet, a coil that generates a magnetic field by application of voltage, and a voltage applying section that applies a voltage to the coil and oscillates the movable body around the axis, wherein the movable body includes a light reflecting plate provided with a light reflecting section having light reflectivity, a support frame that surrounds the light reflecting plate and has a thickness that is, ten times or less, larger than the thickness of the light reflecting plate, and a plurality of connecting sections that connects the light reflecting plate and the support frame at a plurality of locations, and wherein as the voltage applying section applies a voltage of a predetermined frequency to the coil, the movable body oscillates around the axis at the predetermined frequency.

Thus, the stiffness of the support frame is increased with respect to the light reflecting plate, and thus, it is possible to suppress the light reflecting plate from being bent in driving.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of an optical scanner and an image forming apparatus according to the invention will be described with reference to the accompanying drawings.

First Embodiment

Figure 1:
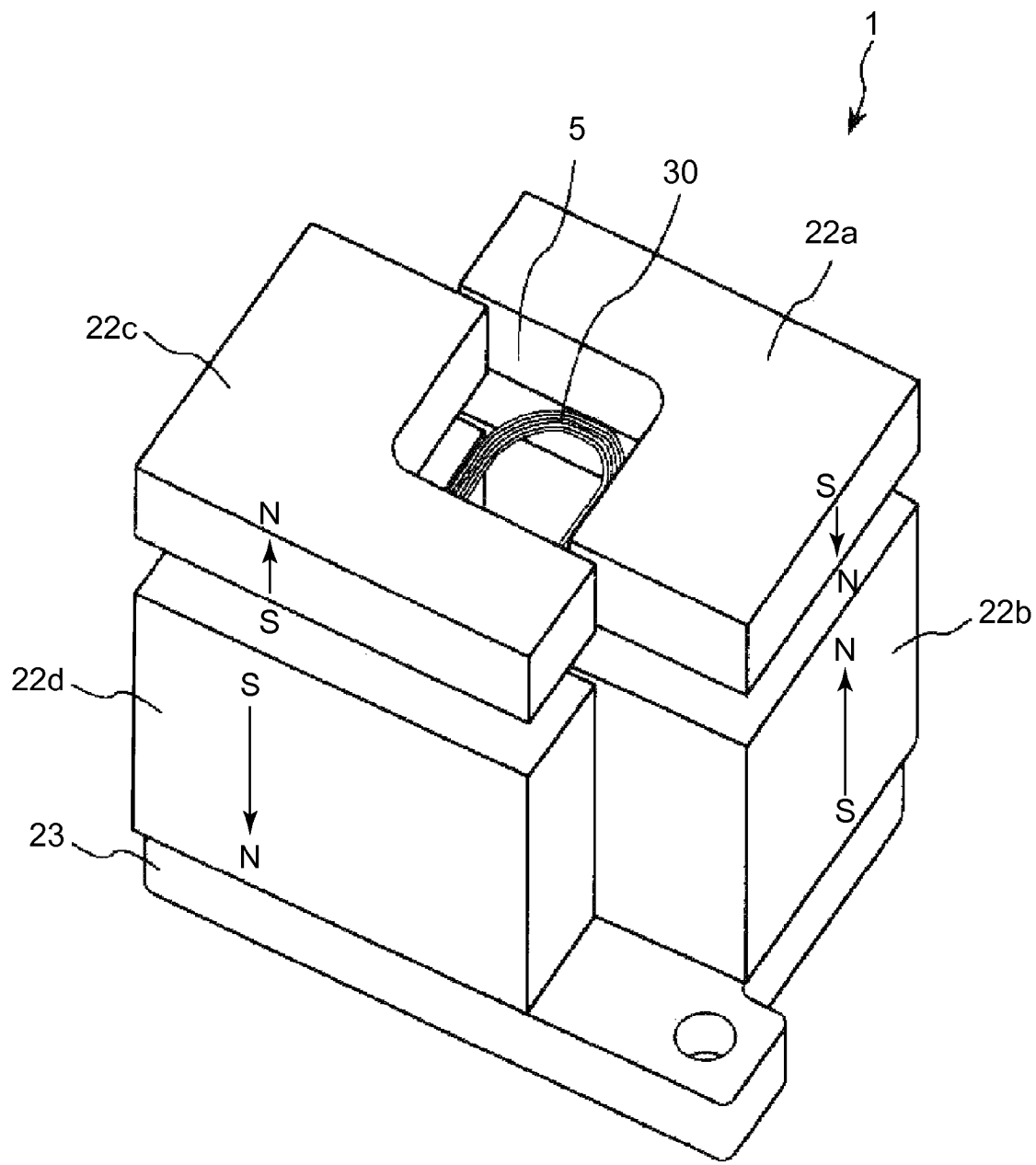
FIG. 1 is a perspective view illustrating a first embodiment of an optical scanner according to the invention.
Figure 2:
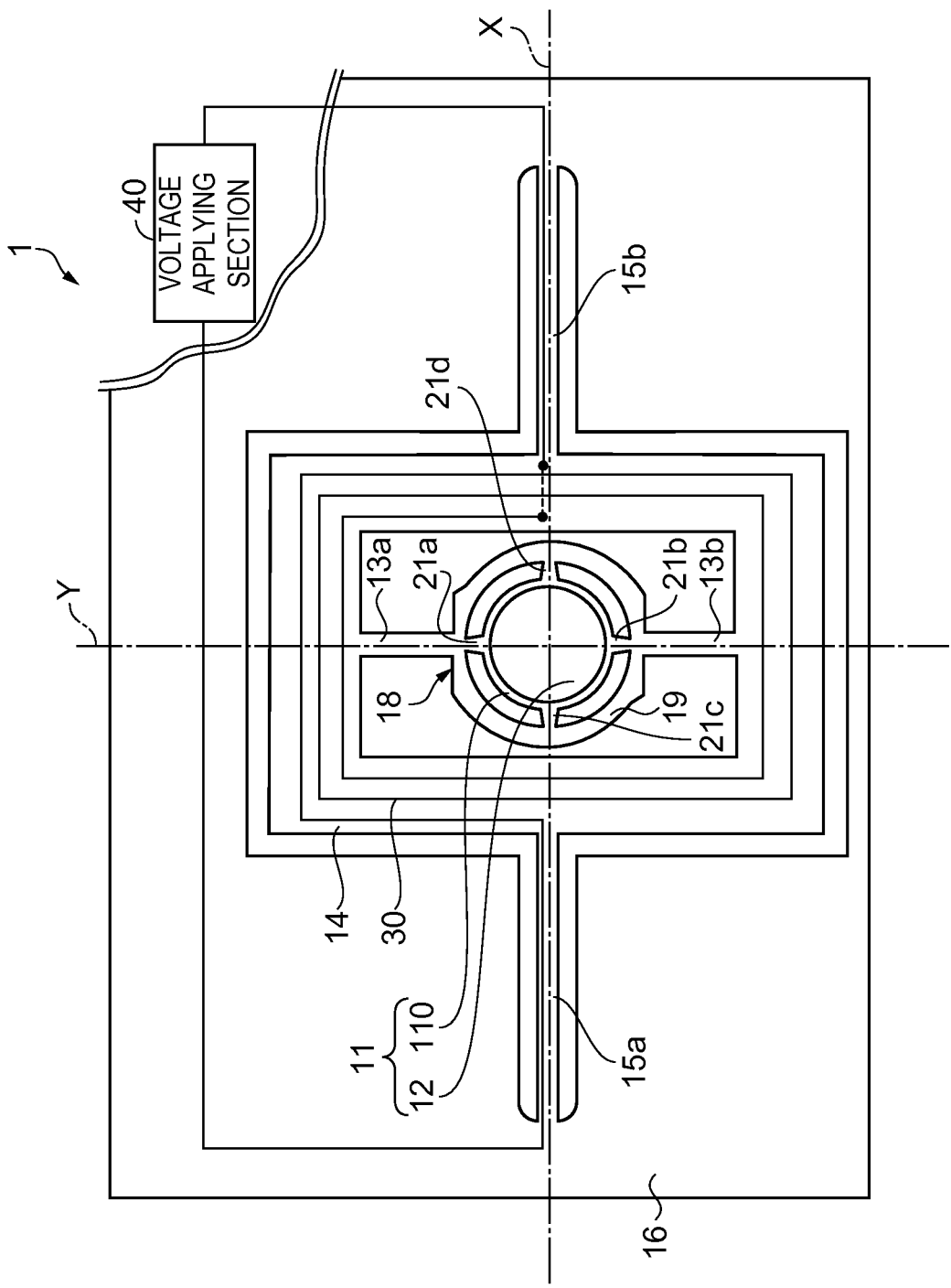
FIG. 2 is a plan view illustrating a movable section, each shaft member, a frame-shaped member, a coil and the like of the optical scanner shown in FIG. 1.
Figure 3:
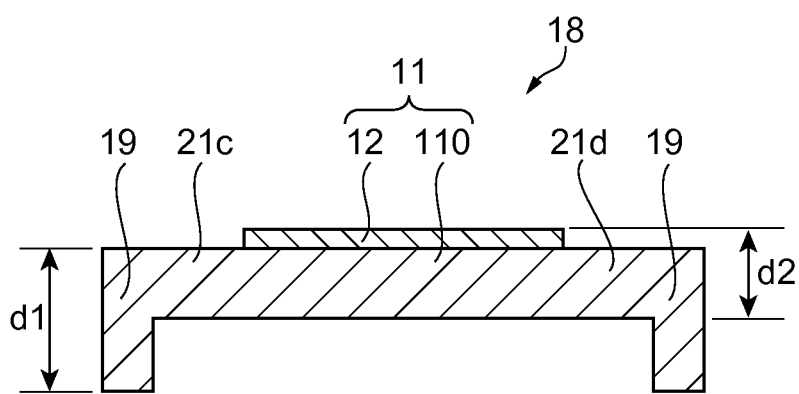
FIG. 3 is a cross-sectional view illustrating the movable section of the optical scanner shown in FIG. 1.
Figure 4:
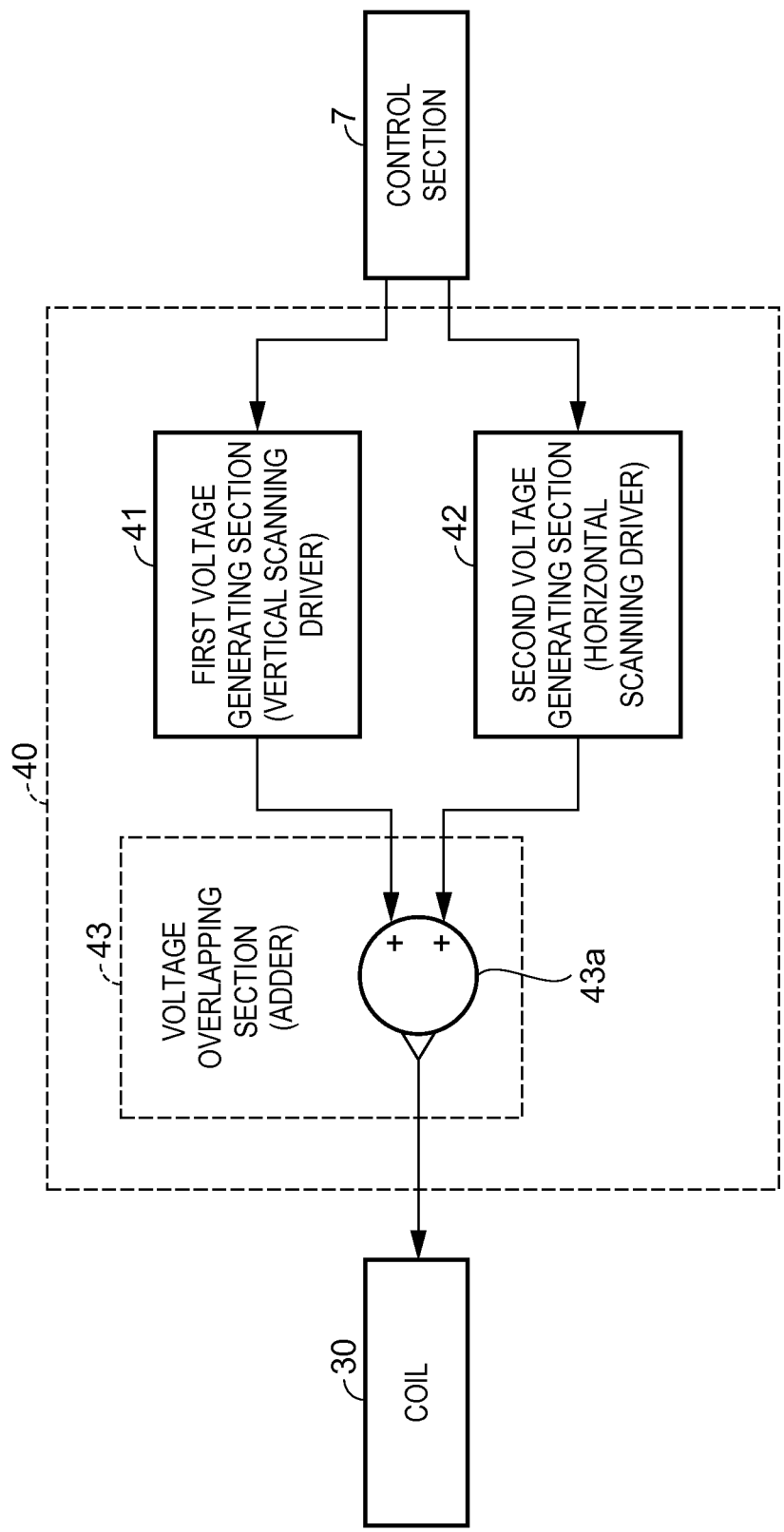
FIG. 4 is a block diagram illustrating a voltage applying section of a drive unit provided in the optical scanner shown in FIG. 1.
Figure 5A:
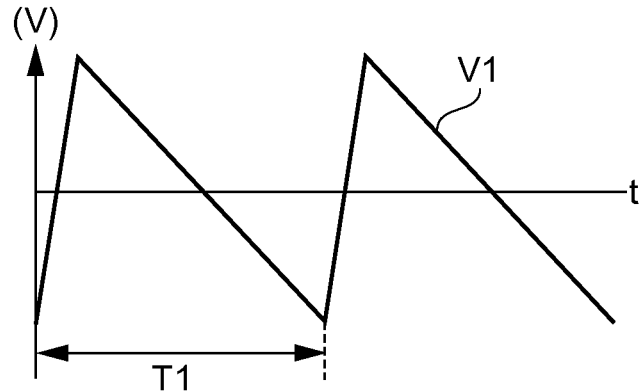
FIGS. 5A and 5B are diagrams illustrating an example of voltage generated in a first voltage generating section and a second voltage generating section shown in FIG. 4.
Figure 5B:
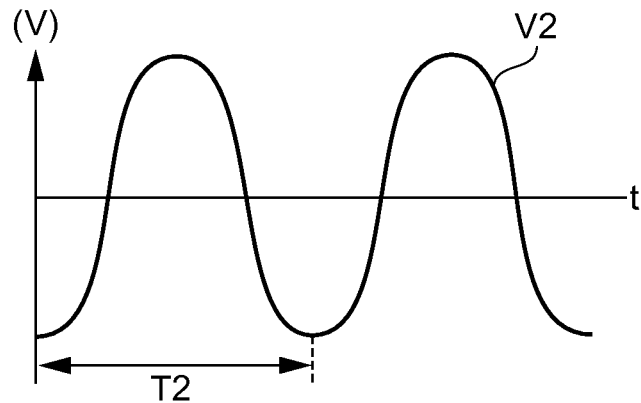

FIG. 1 is a perspective view illustrating a first embodiment of an optical scanner according to the invention, FIG. 2 is a plan view illustrating a movable section, each shaft member, a frame-shaped member, a coil and the like of the optical scanner shown in FIG. 1, FIG. 3 is a cross-sectional view illustrating the movable section of the optical scanner shown in FIG. 1, FIG. 4 is a block diagram illustrating a voltage applying section of a drive unit provided in the optical scanner shown in FIG. 1, FIGS. 5A and 5B are diagrams illustrating an example of voltage generated in a first voltage generating section and a second voltage generating section shown in FIG. 4. Hereinafter, for ease of description, an upper side in FIGS. 1 and 3 is referred to as "up", a lower side therein is referred to as "down", a right side therein is referred to as "right", and a left side therein is referred to as "left". Further, a front side on the plane in FIG. 2 is referred to as "up", a rear side thereon is referred to as "down", a right side thereon is referred to as "right", and a left side thereon is referred to as "left". Further, in FIG. 1, a movable section, a frame-shaped member and a support member are not shown, and a coil disposed in the frame-shaped member is representatively shown.

As shown in FIGS. 1 to 3, an optical scanner 1 includes a substrate 23, a movable section 18, a pair of shaft members (second shaft members) 13a and 13b, a frame-shaped member 14, a pair of shaft members (first shaft members) 15a, and 15b, a support member 16, four permanent magnets 22a, 22b, 22c and 22d, a coil 30 that generates a magnetic field by application of voltage, and a voltage applying section 40 that applies voltage to the coil 30. A movable body is configured by the movable section 18, the shaft members 13a and 13b, and the shaft members 15a and 15b.

The movable section 18 includes a light reflecting plate 11 that includes a light reflecting plate body 110 and a light reflecting section 12 having light reflectivity, a support frame 19 that surrounds the light reflecting plate 11 and has a thickness that is, three times or less, larger than the thickness of the light reflecting plate 11 (see FIG. 3), and four connecting sections 21a, 21b, 21c and 21d that connect the light reflecting plate 11 to the support frame 19 in four positions. The light reflecting section 12 is provided on an upper surface of the light reflecting plate body 110. The number of the connecting sections is not limited to four, and may be in plural. Here, the number of the connecting sections is preferably 4 or 2, and is more preferably 2.

The shape of the light reflecting plate 11 is circular in a planar view in the shown configuration, but is not limited thereto, and may be polygonal such as oval or quadrate or the like in a planar view, for example. Further, the outer appearance of the support frame 19 is approximately circular in a planar view in the shown configuration, but is not limited thereto, and may be polygonal such as oval or quadrate or the like in a planar view, for example.

The connecting sections 21a, 21b, 21c and 21d are elastically deformable, respectively, and thus, one of the light reflecting plate 11 and the support frame 19 may be displaced with respect to the other. Thus, when the optical scanner 1 is driven, that is, when the movable section 18 (light reflecting plate 11) rotates (oscillates), the support frame 19 is preferentially bent compared with the light reflecting plate 11 in the movable section 18, and thus, it is possible to suppress the light reflecting plate 11 from being bent.

Further, the connecting sections 21a, 21b, 21c and 21d are disposed at an equal angle interval, that is, at an interval of 90° in the order of the connecting sections 21a, 21d, 21b and 21c, clockwise in FIG. 2.

Further, the connecting sections 21a and 21b are disposed on a Y axis (second axis) shown in FIG. 2, and the connecting sections 21c and 21d are disposed on an X axis (first axis) shown in FIG. 2 orthogonal to the Y axis. Further, as described later, axis lines of the connecting members 13a and 13b that connect the movable section 18 and the frame-shaped member 14 match with the Y axis.

Thus, the connecting sections 21a and 21b connect portions of the support frame 19 on an extended line of the axis line of the shaft members 13a and 13b, that is, portions of the support frame 19 corresponding to connection portions with the shaft members 13a and 13b and the light reflecting plate 11. Further, the connecting sections 21c and 21d connect portions of the support frame 19 that are farthest from the connection portions with the shaft members 13a and 13b, that is, portions of the support frame 19 that are shifted by 90° from the connection portions with the shaft members 13a and 13b and the light reflecting plate 11. Accordingly, it is possible to further suppress the light reflecting plate 11 from being bent in driving.

The frame-shaped member 14 is supported by the frame-shaped support member 16 by the shaft members 15a and 15b. Further, the movable section 18 is disposed inside the frame-shaped member 14, and is supported by the frame-shaped member 14 by the shaft members 13a and 13b. That is, the frame-shaped member 14 surrounds the movable section 18. Further, the support member 16 is supported by a holder (not shown).

Further, the shape of the frame-shaped member 14 has a quadrate outer appearance in a planar view in the shown configuration, but is not particularly limited as long as the shape is the frame shape. The outer appearance may be a polygon such as a circle, oval or pentagon in a planar view.

The shaft members 13a and 13b and the shaft members 15a and 15b are elastically deformable, respectively. The shaft members 15a and 15b connect the frame-shaped member 14 and the support member 16 so that the frame-shaped member 14 is able to rotate (oscillate) around the X axis (first axis). In this case, the shaft members 15a and 15b are connected to both ends of the frame-shaped member 14 in a direction along the X axis, and both-end-support the frame-shaped member 14 on the support member 16. Further, the shaft members 13a and 13b connect the movable section 18 and the frame-shaped member 14 so that the movable section 18 is able to rotate (oscillate) around the Y axis (the second axis). In this case, the shaft members 13a and 13b are connected to both ends of the movable section 18 in a direction along the Y axis, and both-end-support the movable section 18 on the frame-shaped member 14. The center of the light reflecting plate 11, the center of the support frame 19, and the center of the frame-shaped member 14 are disposed on an intersection point of the X axis and the Y axis in a planar view. Further, the axis line of the shaft members 15a and 15b match with the X axis, and the axis line of the shaft members 13a and 13b match with the Y axis.

As the frame-shaped member 14 is able to rotate around the X axis and the movable section 18 is able to rotate around the Y axis, it is possible to rotate the movable section 18, that is, the light reflecting plate 11 around two orthogonal axes of the X axis and the Y axis.

A first vibration system in which the shaft members 15a and 15b (first axis) form a rotation axis is configured by the light reflecting plate 11, the connecting sections 21a, 21b, 21c and 21d, the support frame 19, the shaft members 13a and 13b, the frame-shaped member 14, the shaft members 15a and 15b, and the coil 30, and a second vibration system in which the shaft members 13a and 13b (second axis) form a rotation axis is configured by the light reflecting plate 11, the connecting sections 21a, 21b, 21c and 21d, the support frame 19, and the shaft members 13a and 13b.

Here, as described above, the support frame 19 is set so that a thickness d1 thereof is, ten times or less, larger than a thickness d2 of the light reflecting plate 11. Thus, the stiffness of the support frame 19 with respect to the light reflecting plate 11 is increased, and it is thus possible to suppress the light reflecting plate 11 from being bent in driving.

If the thickness d1 of the support frame 19 is equal to or less than the thickness d2 of the light reflecting plate 11, it is difficult to sufficiently suppress the light reflecting plate 11 from being bent. Further, if the thickness d1 of the support frame 19 exceeds ten times the thickness d2 of the light reflecting plate 11, the moment of inertia of the support frame 19 is increased, which is disadvantageous for driving.

Further, the thickness d1 of the support frame 19 is preferably two times or more the thickness d2 of the light reflecting plate 11, and is more preferably two times or more and three times or less the thickness d2 of the light reflecting plate 11.

Thus, it is possible to decrease the moment of inertia of the support frame 19 into a relatively small value while suppressing the light reflecting plate 11 from being bent in driving.

Further, the thickness d1 of the support frame 19 is appropriately set according to various conditions, which is not particularly limited. The thickness d1 is preferably 40

µm or more and 800 µm or less, more preferably 40 µm or more and 560 µm or less, and most preferably 60 µm or more and 310 µm or less.

If the thickness d1 of the support frame 19 is less than the lower limit, there is a case where it is difficult to sufficiently suppress the thickness d1 of the light reflecting plate 11 from being bent, although depending on other conditions. Further, if the thickness d1 of the support frame 19 exceeds the upper limit, although depending on other conditions, the moment of inertia of the support frame 19 is increased, which is disadvantageous for driving.

The light reflecting plate body 110, the connecting sections 21a, 21b, 21c and 21d, the support frame 19, the shaft members 13a and 13b, the frame-shaped member 14, the shaft members 15a and 15b, and the support member 16 may be integrally formed using silicon as a main material. By using silicon as the main material, it is possible to realize excellent rotation characteristics, and to achieve excellent durability. Further, it is possible to perform a fine process (working), and to achieve reduction in size of the optical scanner 1.

Further, it is preferable that the light reflecting plate body 110, the connecting sections 21a, 21b, 21c and 21d, the support frame 19, the shaft members 13a and 13b, the frame-shaped member 14, the shaft members 15a and 15b, and the support member 16 be integrally formed by removing an unnecessary portion of a substrate having a stacked structure, for example, an SOI substrate by various etching methods such as dry etching or wet etching. The SOI substrate is a substrate obtained by sequentially stacking a first Si layer (device layer), an $SiO_2$ layer (box layer), and a second Si layer (handle layer).

In this case, the light reflecting plate body 110, the connecting sections 21a, 21b, 21c and 21d, the shaft members 13a and 13b, the frame-shaped member 14, the shaft members 15a and 15b, and the support member 16 are configured by the first Si layer. Further, the support frame 19 has a thickness larger than that of the light reflecting plate 11, and is thus configured by the first Si layer, the $SiO_2$ layer and the second Si layer. Adjustment of the thickness of the support frame 19 may be performed by adjusting any one thickness or both thicknesses of the first Si layer and the second Si layer, for example. Further, the adjustment of the light reflecting plate body 110, the connecting sections 21a, 21b, 21c and 21d, the shaft members 13a and 13b, the frame-shaped member 14, the shaft members 15a and 15b, and the support member 16 may be respectively performed by adjusting the thickness of the first Si layer, for example.

The thickness of each layer of the support frame 19 is appropriately set according to various conditions, which is not particularly limited, but the thickness of the first Si layer is preferably 5 µm or more and 100 µm or less, more preferably 20 µm or more and 60 µm or less, and most preferably 30 µm or more and 60 µm or less. Further, it is preferable that the thickness of the $SiO_2$ layer be 0.4 µm or more and 2 µm or less. In addition, the thickness of the second Si layer is preferably 100 µm or more and 800 µm or less, more preferably 150 µm or more and 500 µm or less, and most preferably 150 µm or more and 250 µm or less.

Further, the thickness of the light reflecting plate body 110, that is, the thickness of the first Si layer that forms the light reflecting plate body 110 is appropriately set according to various conditions, which is not particularly limited, but is preferably 5 µm or more and 100 µm or less, is more preferably 20 µm or more and 60 µm or less, and is most preferably 30 µm or more and 60 µm or less.

Thus, it is possible to decrease the moment of inertia of the support frame 19 into a relatively small value while suppressing the light reflecting plate 11 from being bent in driving.

The permanent magnets 22b and 22d are provided on an upper surface of the substrate 23. Further, the permanent magnets 22a and 22c are respectively provided above the permanent magnets 22b and 22d at a predetermined distance. Further, between the permanent magnets 22a and 22c and between the permanent magnets 22b and 22d, the light reflecting plate 11, the connecting sections 21a, 21b, 21c and 21d, the support frame 19, the shaft members 13a and 13b, the frame-shaped member 14, the shaft members 15a and 15b, and the support member 16 are provided.

Further, the coil 30 is provided on an upper surface of the frame-shaped member 14 (surface thereof on the side where the light reflecting section 12 is provided). The center of the coil 30 matches with the center of the light reflecting plate 11, the center of the support frame 19, and the center of the frame-shaped member 14 in a planar view. FIG. 2 shows that the coil 30 is wound two turns, but this is shown for simplicity of the coil 30. The coil 30 may be wound necessary turns in reality. The coil 30 is electrically connected to the voltage applying section 40. The drive unit that rotates the movable section 18 and the frame-shaped member 14 is configured by the permanent magnets 22a, 22b, 22c and 22d, the coil 30, and the voltage applying section 40.

The coil 30 may be provided on a lower surface of the frame-shaped member 14 (surface thereof that faces the substrate 23), or may be provided on both of the lower surface and the upper surface of the frame-shaped member 14. Further, the coil 30 may be wound on a magnetic core.

Each of the permanent magnets 22a, 22b, 22c and 22d is formed in an L shape in the shown configuration. The thickness of each of the permanent magnets 22a and 22c is set to be thicker than the permanent magnets 22b and 22d.

Further, the permanent magnet 22a and the permanent magnet 22c are disposed so that concave portions of bending portions thereof face each other, and an opening 5 is formed between the permanent magnet 22a and the permanent magnet 22c, that is, at the center thereof. Similarly, the permanent magnet 22b and the permanent magnet 22d are disposed so that concave portions of bending portions thereof face each other. The movable section 18, the shaft members 13a and 13b, and the frame-shaped member 14 are disposed at the position of the opening 5 in a planar view, and thus, the frame-shaped member 14 is able to rotate. Further, light is irradiated onto the light reflecting plate 11 through the opening 5, and the light reflected from the light reflecting plate 11 is output to the outside. Further, the center of the opening 5 matches with the center of the coil 30 in a planar view.

Further, the permanent magnets 22a, 22b, 22c and 22d are respectively magnetized in the thickness direction, that is, in a vertical direction in FIG. 1. In this case, the permanent magnets 22a and 22d are magnetized so that an upper side in FIG. 1 is the south pole and a lower side is the north pole, and the permanent magnets 22b and 22c are magnetized so that an upper side in FIG. 1 is the north pole and a lower side is the south pole. That is, the permanent magnets 22a and 22b are magnetized so that facing surface sides are respectively the north pole, and the permanent magnets 22c and 22d are magnetized so that facing surface sides are respectively the south pole.

A magnet obtained by magnetizing a hard magnetic body such as a neodymium magnet, a ferrite magnet, a samariumcobalt magnet, an alnico magnet, a bond magnet or the like may be suitably used as the permanent magnets 22a, 22b, 22c and 22d.

The coil 30 is electrically connected to the voltage applying section 40. Further, as voltage is applied to the coil 30 by the voltage applying section 40, a magnetic field is generated in the coil 30.

As shown in FIG. 4, the voltage applying section 40 includes a first voltage generating section 41 that generates a first voltage V1 for rotation of the light reflecting plate 11 (movable section 18) around the X axis, a second voltage generating section 42 that generates a second voltage V2 for rotation of the light reflecting plate 11 (movable section 18) around the Y axis, and a voltage overlapping section 43 that overlaps the first voltage V1 and the second voltage V2 and applies the overlapped voltage to the coil 30.

The first voltage generating section 41 generates the first voltage V1 (vertical scanning voltage) that periodically varies at a cycle T1, as shown in FIG. 5A.

The first voltage V1 forms a waveform such as a sawtooth wave. Thus, the optical scanner 1 can effectively perform vertical scanning (sub scanning) with respect to the light. The waveform of the first voltage V1 is not limited thereto. Here, the frequency (1/T1) of the first voltage V1 is not particularly limited as long as the frequency is suitable for the vertical scanning, but is preferably 30 to 80 Hz (about 60 Hz).

In the embodiment, the frequency of the first voltage V1 is adjusted to be in a frequency different from a torsional resonance frequency (resonance frequency) of the first vibration system configured by the permanent magnet 20c, the light reflecting plate 11, the connecting sections 21a, 21b, 21c and 21d, the support frame 19, the shaft members 13a and 13b, the frame-shaped member 14, the shaft members 15a and 15b, and the coil 30.

On the other hand, the second voltage generating section 42 generates the second voltage V2 (horizontal scanning voltage) that periodically varies at a cycle T2 different from the cycle T1, as shown in FIG. 5B.

The second voltage V2 forms a waveform such as a sine wave. Thus, the optical scanner 1 can effectively perform main scanning with respect to the light. The waveform of the second voltage V2 is not limited thereto.

It is preferable that the frequency (second frequency) of the second voltage V2 be larger than the frequency (first frequency) of the first voltage V1. That is, it is preferable that the cycle T2 be shorter than the cycle T1. Thus, it is possible to more reliably and smoothly rotate the light reflecting plate 11 around the Y axis at the second frequency while rotating the light reflecting plate 11 around the X axis at the first frequency.

Further, the second frequency is not particularly limited as long as the second frequency is different from the first frequency and is a frequency suitable for the horizontal scanning, but is preferably 10 to 40 kHz. In this way, by setting the frequency of the second voltage V2 to 10 to 40 kHz and setting the frequency of the first voltage V1 to about 60 Hz as described above, it is possible to rotate the light reflecting plate 11 around the respective axes of two orthogonal axes (X axis and Y axis) at the frequencies suitable for drawing on a display. Here, as long as the light reflecting plate 11 can be rotated around the respective axes of the X axis and the Y axis, a combination of the frequency of the first voltage V1 and the frequency of the second voltage V2 is not particularly limited.

In the embodiment, the second frequency is set to be the same as a torsional resonance frequency (f2) of the second vibration system for rotating the shaft members 13a and 13b that are configured by the light reflecting plate 11, the connecting sections 21a, 21b, 21c and 21d, the support frame 19, and the shaft members 13a and 13b. That is, the second vibration system is designed (manufactured) so that the torsional resonance frequency f2 becomes a frequency suitable for the horizontal scanning. Thus, it is possible to increase the rotation angle of the light reflecting plate 11 around the Y axis. Further, it is preferable that the first frequency be 1/10 or less of the torsional resonance frequency (f1) of the first vibration system for rotating the shaft members 15a and 15b that are configured by the light reflecting plate 11, the connecting sections 21a, 21b, 21c and 21d, the support frame 19, the shaft members 13a and 13b, the frame-shaped member 14, and the shaft members 15a and 15b, and the coil 30. In order to drive the first vibration system in a non-resonance state (amplitude gain is 1), it is necessary to set the first frequency to 1/10 or less of f1. This is because if driving is performed at a frequency larger than 1/10 of f1, there is a possibility that resonance of the first vibration system occurs.

Further, it is preferable that the second frequency be ten times or more the first frequency in order to drive the first vibration system at the non-resonance state (amplitude gain is 1). If the second frequency is smaller than ten times the first frequency, when the second voltage V2 is applied to the coil 30, the first vibration system is also rotated, and thus, driving signal crosstalk is generated. As described above, since it is preferable that the first frequency be 1/10 or less of the first frequency f1, it is preferable that the second frequency be larger than the first frequency from the above relationship.

Further, when the torsional resonance frequency of the first vibration system is set to f1 [Hz] and the torsional resonance frequency of the second vibration system is set to f2 [Hz], it is preferable that f1 and f2 satisfy the relationship of f2>f1, and it is more preferable that f1 and f2 satisfy the relationship of f2≥10f1. Thus, it is possible to rotate the light reflecting plate 11 around the Y axis at the frequency of the second voltage V2 while rotating the light reflecting plate 11 around the X axis at the frequency of the first voltage V1. In the case of f2≤f1, there is a possibility that vibration of the first vibration system occurs due to the first frequency.

The first voltage generating section 41 and the second voltage generating section 42 are respectively connected to a control section 7, and are driven on the basis of signals from the control section 7. The voltage overlapping section 43 is connected to the first voltage generating section 41 and the second voltage generating section 42.

The voltage overlapping section 43 includes an adder 43a for application of voltage to the coil 30. The adder 43a receives the first voltage V1 from the first voltage generating section 41, receives the second voltage V2 from the second voltage generating section 42, and overlaps the voltages to apply the result to the coil 30.

Next, a method of driving the optical scanner 1 will be described. In the embodiment, as described above, the frequency of the first voltage V1 is set to a value that is different from the torsional resonance value of the first vibration system, and the frequency of the second voltage V2 is set to a value that is the same as the torsional resonance frequency of the second vibration system and is larger than the frequency of the first voltage V1 (for example, the frequency of the first voltage V1 is 60 Hz, and the frequency of the second voltage V2 is 15 kHz).

For example, the first voltage V1 as shown in FIG. 5A and the second voltage V2 as shown in FIG. 5B are overlapped by the voltage overlapping section 43, and the overlapped voltage is applied to the coil 30.

Thus, while the shaft members 15a and 15b are torsionally deformed by a Lorentz force generated due to application of the first voltage V1, the frame-shaped member 14 rotates together with the light reflecting plate 11 around the X axis at the frequency of the first voltage V1. Further, while the shaft members 13a and 13b are torsionally deformed by a Lorentz force generated due to application of the second voltage V2, the movable section 18, that is, the light reflecting plate 11 rotates around the Y axis at the frequency of the second voltage V2.

As described above, according to the embodiment, by applying the voltage obtained by overlapping the first voltage V1 and the second voltage V2 to the coil 30, it is possible to rotate the light reflecting plate 11 around the Y axis at the frequency of the second voltage V2 while rotating the light reflecting plate 11 around the X axis at the frequency of the first voltage V1. Thus, it is possible to reduce the cost and size of the apparatus, and to rotate the light reflecting plate 11 around the respective axes of the X axis and the Y axis.

Further, it is possible to suppress the light reflecting plate 11 from being bent while reducing the moment of inertia of the support frame 19 into a relatively small value, and to suitably rotate the light reflecting plate 11 around the respective axes of the X axis and the Y axis.

Further, by appropriately changing the first voltage V1 and the second voltage V2, it is possible to obtain a desired vibration characteristic without changing the structure of the second vibration system and the first vibration system.

Second Embodiment

Figure 6:
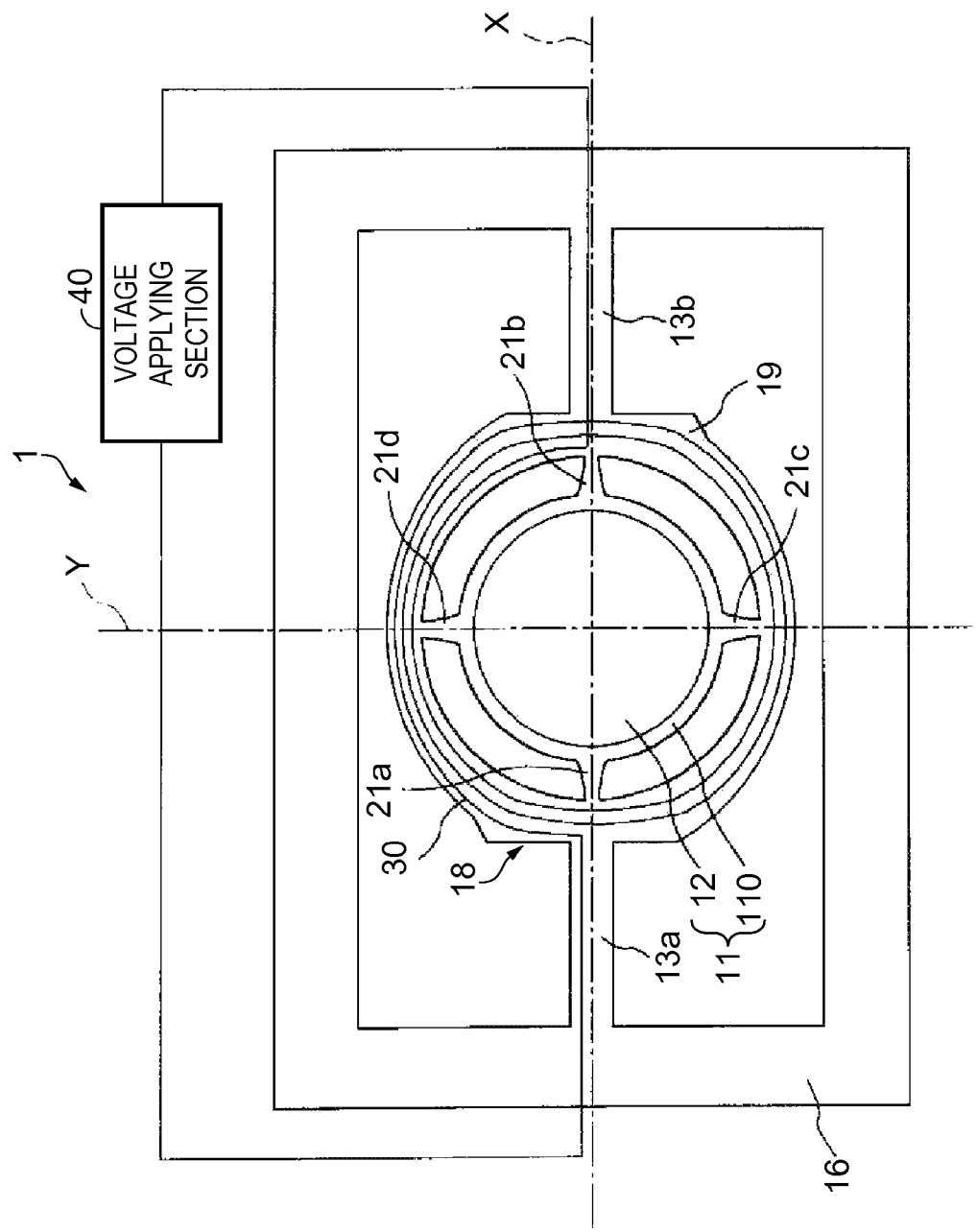
FIG. 6 is a plan view illustrating a movable section, each shaft member, a coil and the like in a second embodiment of an optical scanner according to the invention.

FIG. 6 is a plan view illustrating a movable section, each shaft member, a coil and the like in a second embodiment of an optical scanner according to the invention. Hereinafter, for ease of description, a front side on the plane in FIG. 6 is referred to as "up", a rear side thereon is referred to as "down", a right side thereon is referred to as "right", and a left side thereon is referred to as "left".

Hereinafter, in the second embodiment, different points from the above-described first embodiment will be mainly described, and the same configuration will not be described.

As shown in FIG. 6, an optical scanner 1 according to the second embodiment includes a substrate 23, a movable section 18, a pair of shaft members (first shaft members) 13a and 13b, a support member 16, four permanent magnets 22a, 22b, 22c and 22d, a coil 30 that generates a magnetic field by application of voltage, and a voltage applying section 40 that applies voltage to the coil 30 (see FIG. 1). A movable body is configured by the movable section 18.

Further, connecting sections 21a and 21b are disposed on the X axis (first axis) shown in FIG. 6, and connecting sections 21c and 21d are disposed on the Y axis (second axis).

Further, the shaft members 13a and 13b connect the movable section 18 and the support member 16 to be able to rotate the movable section 18 around the X axis. In this case, the shaft members 13a and 13b are connected to both ends of the movable section 18 in a direction along the X axis, and both-end-support the movable section 18 on the support member 16. Thus, the movable section 18, that is, the light reflecting plate 11 is able to rotate around the X axis.

A first vibration system in which the shaft members 13a and 13b (first axis) form a rotation axis is configured by the light reflecting plate 11, the connecting sections 21a, 21b, 21c and 21d, the support frame 19, the shaft members 13a and 13b, and the coil 30.

Further, the coil 30 is disposed on an upper surface of the support frame 19 of the movable section 18 (surface thereof on the side where the light reflecting section 12 is provided). Thus, the stiffness of the support frame 19 is increased, and it is thus possible to reliably suppress the light reflecting plate 11 from being bent in driving.

Further, the voltage applying section 40 is obtained by removing the first voltage generating section 41 and the voltage overlapping section 43 in the configuration shown in FIG. 4.

In the optical scanner 1, if a second voltage V2 is applied to the coil, while the shaft members 13a and 13b are torsionally deformed by a Lorentz force generated due to the voltage applying section 40, the movable section 18, that is, the light reflecting plate 11 rotates around the X axis at the frequency of the second voltage V2.

The coil 30 may not be provided in the support frame 19, but instead, may be provided in a light reflecting plate body 110 outside the light reflecting section 12 of the light reflecting plate 11, for example. Thus, it is possible to increase the number of turns of the coil 30, compared with a case where the coil 30 is provided in the support frame 19.

Third Embodiment

Figure 7:
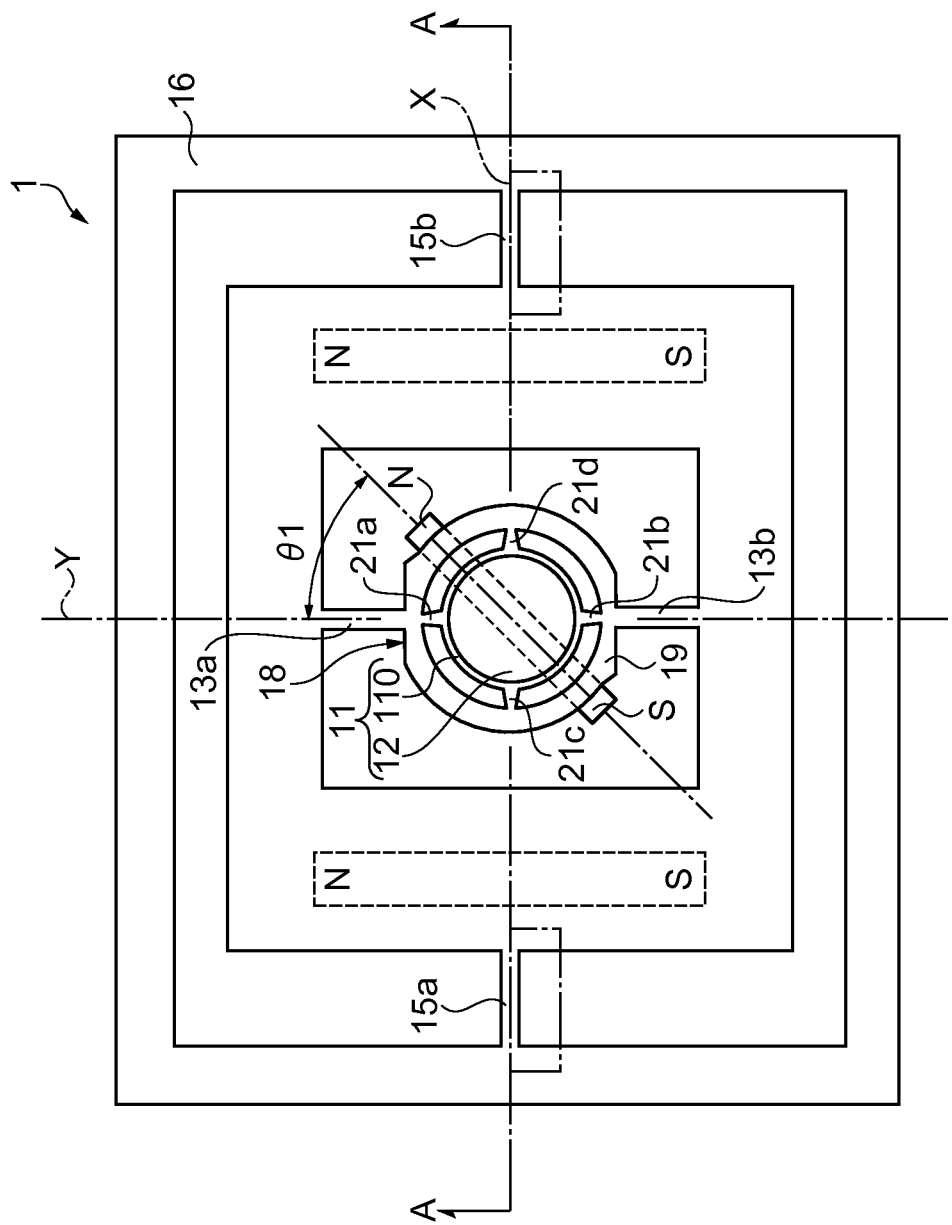
FIG. 7 is a plan view illustrating a third embodiment of an optical scanner according to the invention.
Figure 8:
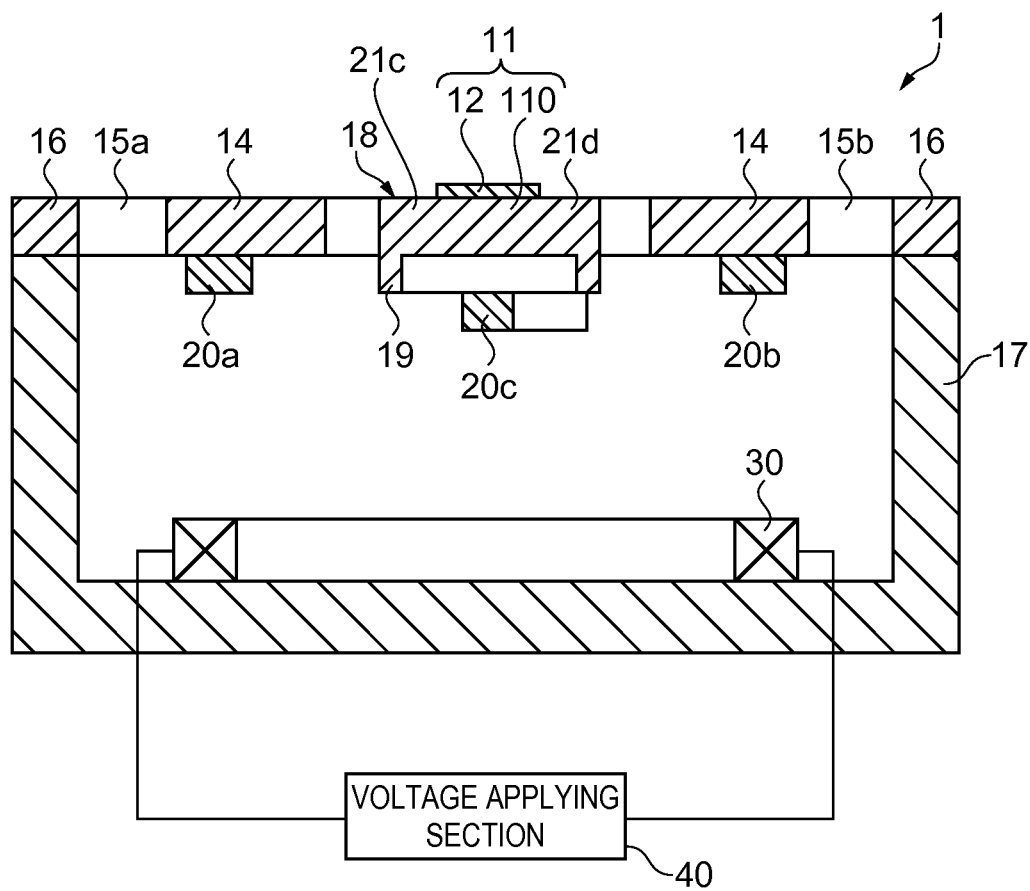
FIG. 8 is a cross-sectional view taken along line A-A in FIG. 7.

FIG. 7 is a plan view illustrating a third embodiment of an optical scanner according to the invention, and FIG. 8 is a cross-sectional view taken along line A-A in FIG. 7.

Hereinafter, for ease of description, a front side on the plane in FIG. 7 is referred to as "up", a rear side thereon is referred to as "down", a right side thereon is referred to as "right", and a left side thereon is referred to as "left". An upper side in FIG. 8 is referred to as "up", a lower side therein is referred to as "down", a right side therein is referred to as "right", and a left side therein is referred to as "left".

Hereinafter, with respect to the third embodiment, different points from the above-described first embodiment will be mainly described, and the same configuration will not be described.

As shown in FIGS. 7 and 8, an optical scanner 1 according to the third embodiment includes a movable section 18, a pair of shaft members (second shaft members) 13a and 13b, a frame-shaped member 14, a pair of shaft members (first shaft members) 15a and 15b, a support member 16, a pair of permanent magnets (first permanent magnets) 20a and 20b, a permanent magnet (second permanent magnet) 20c, a holder 17, a coil 30 that generates a magnetic field by application of voltage, and a voltage applying section 40 that applies voltage to the coil 30. The support member 16 is supported on the holder 17.

The holder 17 is formed using glass or silicon as a main material, for example. The shape of the holder 17 is a concave shape in the shown configuration and is quadrate in a planar view, but is not particularly limited as long as the holder 17 can support the support member 16. A method of bonding the support member 16 and the holder 17 is not particularly limited, and the support member 16 and the holder 17 may be bonded using an adhesive or anodic bonding. Further, for example, an $SiO_2$ layer formed using $SiO_2$ as a main material may be interposed between the support member 16 and the holder 17.

A first vibration system in which the shaft members 15a and 15b (first axis) form a rotation axis is configured by the permanent magnet 20c, the movable section 18, the shaft members 13a and 13b, the permanent magnets 20a and 20b, the frame-shaped member 14, and the shaft members 15a and 15b, and a second vibration system in which the shaft members 13a and 13b (second axis) form a rotation axis is configured by the permanent magnet 20c, the movable section 18, the shaft members 13a and 13b.

A pair of permanent magnets 20a and 20b is provided on a lower surface of the frame-shaped member 14 (surface thereof that faces the holder 17), and the permanent magnet 20c is provided on a lower surface of a support frame 19 of the movable section 18 (surface thereof on the side opposite to a light reflecting section 12).

By providing the permanent magnet 20c in the support frame 19, the stiffness of the support frame 19 is increased by the permanent magnet 20c, and it is thus possible to reliably suppress a light reflecting plate 11 from being bent in driving.

A method of bonding the permanent magnets 20a and 20b and the frame-shaped member 14, and a method of bonding the permanent magnet 20c and the support frame 19 are not particularly limited, respectively, and for example, the bonding may be performed using an adhesive. Further, the coil 30 that generates a magnetic field that acts on the permanent magnets 20a, 20b and 20c is provided on an upper surface of the holder 17. The coil 30 is electrically connected to the voltage supplying section 40. A drive unit that rotates the movable section 18 and the frame-shaped member 14 is configured by the permanent magnets 20a, 20b and 20c, the coil 30, and the voltage applying section 40.

Each of the permanent magnets 20a and 20b is formed in a longitudinal shape, a plate shape and a straight rod shape in the shown configuration, which is magnetized in the length direction thereof. That is, the direction of a line segment that connects the south pole and the north pole of the permanent magnet 20a matches with the length direction of the permanent magnet 20a. In other words, the line segment that connects the south pole and the north pole of the permanent magnet 20a matches with an axis line of the permanent magnet 20a. This is similarly applied to the permanent magnet 20b.

The permanent magnet 20a is disposed on the left side with reference to the Y axis, and the permanent magnet 20b is disposed on the right side with reference to the Y axis. Further, the permanent magnets 20a and 20b are disposed so that the X axis is interposed between both poles thereof, respectively. That is, the permanent magnets 20a and 20b are respectively disposed so that both end parts (respective magnetic poles) are positioned in two regions divided by the X axis. Further, the permanent magnets 20a and 20b are respectively disposed so that the axis lines thereof are orthogonal to the X axis. Thus, it is possible to smoothly and reliably rotate the light reflecting plate 11 around the X axis, and to increase the rotation angle of the light reflecting plate 11 around the X axis. Further, it is possible to prevent or suppress compound stress from being generated in the shaft members 15a and 15b.

The shape of the respective permanent magnets 20a and 20b is not limited to the longitudinal shape.

Further, the permanent magnet 20c is a longitudinal shape, and a plate shape and a straight rod shape in the shown configuration, which is magnetized in the length direction thereof. That is, the direction of a line segment that connects the south pole and the north pole of the permanent magnet 20c matches with the length direction of the permanent magnet 20c. In other words, the line segment that connects the south pole and the north pole of the permanent magnet 20c matches with an axis line of the permanent magnet 20c.

The permanent magnet 20c is disposed so that the Y axis is interposed between both poles thereof. Further, the permanent magnet 20c is disposed so that the axis line thereof is inclined with respect to the X axis and the Y axis. Further, the permanent magnet 20c is disposed so that the X axis is interposed between both poles thereof. That is, the permanent magnet 20c is disposed so that respective end parts (magnetic poles) are positioned in two regions divided by the X axis, and in two regions divided by the Y axis. As the axis line of the permanent magnet 20c is inclined with respect to the Y axis, the axis line of the permanent magnet 20c is not orthogonal to the axis lines of the permanent magnet 20a and the permanent magnet 20b, and thus, in a state where a hard magnetic body before magnetization of the permanent magnet 20a, a hard magnetic body before magnetization of the permanent magnet 20b, and a hard magnetic body before magnetization of the permanent magnet 20c are respectively provided in the frame-shaped member 14 and the support frame 19, it is possible to reliably perform magnetization of each hard magnetic body.

The shape of the permanent magnet 20c is not limited to the longitudinal shape as long as it can be provided in the support frame 19.

Further, an angle (inclination angle of the axis line of the permanent magnet 20c with respect to the Y axis) θ1 formed by the Y axis, that is, axis lines of the shaft members 13a and 13b and the axis line of the permanent magnet 20c is not particularly limited, but is preferably 30° or more and 60° or less, more preferably 45° or more and 60° or less, and most preferably 45°. By providing the permanent magnet 20c in this way, it is possible to smoothly and reliably rotate the light reflecting plate 11 around the Y axis, and to reliably perform the magnetization. In this regard, if the inclination angle θ1 is smaller than the lower limit, there is a case where it is difficult to sufficiently rotate the light reflecting plate 11 around the Y axis according to various conditions such as the level of voltage applied to the coil 30 by the voltage applying section 40. On the other hand, if the inclination angle θ1 exceeds the upper limit, there is a case where it is difficult to sufficiently perform magnetization according to various conditions when the hard magnetic bodies are simultaneously magnetized to form the permanent magnets 20a, 20b and 20c in a state where the hard magnetic bodies before magnetization are provided in the frame-shaped member 14 and the light reflecting plate 11. Further, in a case where the other side of the permanent magnet 20c is magnetized after the permanent magnets 20a and 20b are magnetized, or in a case where the permanent magnets 20a and 20b are magnetized after the permanent magnet 20c is magnetized, there is a case where a great force is applied to the permanent magnet after magnetization by a magnetic field for magnetization and the shaft member is damaged, and thus, it is difficult to perform magnetization.

Further, the permanent magnets 20a and 20b are respectively disposed to form line symmetry with respect to the X axis, that is, the axis line of the shaft members 15a and 15b in a planar view. Further, the permanent magnet 20a and the permanent magnet 20b are respectively disposed to form line symmetry with respect to the Y axis, that is, the axis lines of the shaft members 13a and 13b in a planar view, and thus, it is possible to smoothly rotate the light reflecting plate 11 around the X axis.

Further, the permanent magnet 20c is disposed so that the center thereof matches with the center of the light reflecting plate 11 in a planar view. Further, the permanent magnet 20c is disposed to form point symmetry with respect to the center of the light reflecting plate 11 in a planar view. Thus, it is possible to smoothly rotate the light reflecting plate 11 around the X axis and the Y axis.

In the present embodiment, the permanent magnets 20a and 20b are provided on the lower surface of the frame-shaped member 14 (surface thereof that faces the holder 17), but this is not limitative. The permanent magnet 20a may be provided on an upper surface of the frame-shaped member 14 (surface thereof on the side where the light reflecting section 12 is provided), or may be provided on both of the lower surface and the upper surface of the frame-shaped member 14. Similarly, the permanent magnet 20b may be provided on the upper surface of the frame-shaped member 14, or may be provided on both of the lower surface and the upper surface of the frame-shaped member 14. In a case where the permanent magnet 20a is provided on the upper surface of the frame-shaped member 14, it is preferable that the permanent magnet 20b be also provided on the upper surface of the frame-shaped member 14. Further, in a case where the permanent magnet 20a is provided on both of the lower surface and the upper surface of the frame-shaped member 14, it is preferable that the permanent magnet 20b be also provided on both of the lower surface and the upper surface of the frame-shaped member 14.

The same permanent magnets as in the first embodiment may be used as the permanent magnets 20a, 20b and 20c. Further, when the hard magnetic bodies are magnetized to form the permanent magnets 20a, 20b and 20c, magnetization is performed after the hard magnetic bodies before magnetization are provided in the frame-shaped member 14 and the light reflecting plate 11. If the permanent magnets 20a, 20b and 20c that are already magnetized are installed in the frame-shaped member 14 and the light reflecting plate 11, when the permanent magnets 20a, 20b and 20c are disposed on the frame-shaped member 14 and the light reflecting plate 11, any two or three of the permanent magnets 20a, 20b and 20c are attracted to each other by a magnetic force, and thus, the structure of the frame-shaped member 14 and the light reflecting plate 11 is damaged by the force. Further, any two or three of the permanent magnets 20a, 20b and 20c are adhered to each other, and thus, it is difficult to install the permanent magnets 20a, 20b and 20c.

In the optical scanner 1, since the axis lines of the permanent magnets 20a and 20b and the axis line of the permanent magnet 20c are not orthogonal to each other, it is possible to reliably perform the magnetization.

The coil 30 is provided directly below the permanent magnets 20a, 20b and 20c. That is, the coil 30 is provided to face the lower surfaces of the movable section 18 (support frame 19) and the frame-shaped member 14. Thus, it is possible to cause the magnetic field generated from the coil 30 to effectively act on the permanent magnets 20a, 20b and 20c. Thus, it is possible to achieve power saving and reduction in size in the optical scanner 1.

Next, a method of driving the optical scanner 1 will be described. In the embodiment, as described above, the frequency of the first voltage V1 is set to a value that is different from the torsional resonance frequency of the first vibration system, and the frequency of the second voltage V2 is set to a value that is the same as the torsional resonance frequency of the second vibration system and is larger than the frequency of the first voltage V1 (for example, the frequency of the first voltage V1 is 60 Hz, and the frequency of the second voltage V2 is 15 kHz).

For example, the first voltage V1 as shown in FIG. 5A and the second voltage V2 as shown in FIG. 5B are overlapped by the voltage overlapping section 43, and the overlapped voltage is applied to the coil 30.

Then, a magnetic field (referred to as "magnetic field A1") that causes the vicinities of bonding portions between the frame-shaped member 14 and the north poles of the permanent magnets 20a and 20b and the vicinity of a bonding portion between the support frame 19 and the north pole of the permanent magnet 20c to be attracted to the coil 30 and causes the vicinities of bonding portions between the frame-shaped member 14 and the south poles of the permanent magnets 20a and 20b and the vicinity of a bonding portion between the support frame 19 and the south pole of the permanent magnet 20c to be separated from the coil 30 and a magnetic field (referred to as "magnetic field A2") that causes the vicinities of the bonding portions between the frame-shaped member 14 and the north poles of the permanent magnets 20a and 20b and the vicinity of the bonding portion between the support frame 19 and the north pole of the permanent magnet 20c to be separated from the coil 30 and causes the vicinities of the bonding portions between the frame-shaped member 14 and the south poles of the permanent magnets 20a and 20b and the vicinity of the bonding portion between the support frame 19 and the south pole of the permanent magnet 20c to be attracted to the coil 30 are alternately switched by the first voltage V1.

Here, as described above, the permanent magnets 20a and 20b are disposed so that the respective end parts (magnetic poles) are positioned in two regions divided by the X axis. That is, the north pole of the permanent magnet 20a is positioned in one region with reference to the X axis, and the south pole thereof is positioned in the other region. Thus, as the magnetic field A1 and the magnetic field A2 are alternately switched, while the shaft members 15a and 15b are torsionally deformed, the frame-shaped member 14, that is, the light reflecting plate 11 rotates together with the support frame 19 around the X axis at the frequency of the first voltage V1.

Further, in the optical scanner 1, since the permanent magnets 20a and 20b are disposed so that the axis lines thereof is orthogonal to the X axis, it is possible to reduce compound stress generated in the shaft members 15a and 15b or to prevent generation of the compound stress, and to increase the rotation angle of the light reflecting plate 11 around the X axis.

Further, the frequency of the first voltage V1 is set to be extremely lower than the frequency of the second voltage V2. Further, the torsional resonance frequency of the first vibration system is designed to be lower than the torsional resonance frequency of the second vibration system (for example, to be 1/10 or less of the torsional resonance frequency of the second vibration system). That is, the first vibration system is designed to easily vibrate compared with the second vibration system, and thus, the frame-shaped member 14 rotates around the X axis by the first voltage V1. That is, it is possible to prevent the frame-shaped member 14 from rotating around the X axis by the second voltage V2.

On the other hand, a magnetic field (referred to as "magnetic field B1") that causes the vicinity of the bonding portion between the frame-shaped member 14 and the north pole of the permanent magnet 20a and the vicinity of the bonding portion between the support frame 19 and the north pole of the permanent magnet 20c to be attracted to the coil 30 and causes the vicinity of the bonding portion between the frame-shaped member 14 and the south pole of the permanent magnet 20a and the vicinity of the bonding portion between the support frame 19 and the south pole of the permanent magnet 20c to be separated from the coil 30 and a magnetic field (referred to as "magnetic field B2") that causes the vicinity of the bonding portion between the frame-shaped member 14 and the north pole of the permanent magnet 20a and the vicinity of the bonding portion between the support frame 19 and the north pole of the permanent magnet 20c to be separated from the coil 30 and causes the vicinity of the bonding portion between the frame-shaped member 14 and the south pole of the permanent magnet 20a and the vicinity of the bonding portion between the support frame 19 and the south pole of the permanent magnet 20c to be attracted to the coil 30 are alternately switched by the second voltage V2.

Here, as described above, the permanent magnet 20c is disposed so that the respective end parts (magnetic poles) are positioned in two regions divided by the Y axis. That is, the north pole of the permanent magnet 20c is positioned in one region with reference to the Y axis, and the south pole thereof is positioned in the other region. Thus, as the magnetic field B1 and the magnetic field B2 are alternately switched, while the shaft members 13a and 13b are torsionally deformed, the movable section 18, that is, the light reflecting plate 11 rotates around the Y axis at the frequency of the second voltage V2.

The frequency of the second voltage V2 is the same as the torsional resonance frequency of the second vibration system. Thus, it is possible to rotate the light reflecting plate 11 around the Y axis by the second voltage V2. That is, it is possible to prevent the light reflecting plate 11 from rotating around the Y axis by the first voltage V1.

According to the embodiment, since the coil 30 as a heat radiating body is not provided in the first vibration system and the second vibration system, it is possible to prevent or suppress bending of the vibration systems or change in the resonance frequency due to heat generated from the coil 30 by electric conduction, in addition to the same effects as in the first embodiment. As a result, despite continuous use for a long time, the optical scanner 1 is capable of achieving desired vibration.

In the present embodiment, the axis line of the permanent magnet 20c among the permanent magnets 20a, 20b and 20c is inclined with respect to the Y axis, but this is not limitative, and at least any one of the axis line of the permanent magnet 20c and the axis lines of the permanent magnets 20a and 20b may be inclined with respect to the Y axis. For example, only the axis lines of the permanent magnets 20a and 20b may be inclined with respect to the Y axis. Further, the permanent magnets 20a, 20b and 20c may be inclined with respect to the Y axis.

Further, in the embodiment, the permanent magnet 20c is provided on the lower surface of the support frame 19 of the movable section 18, but this is not limitative. For example, the permanent magnet 20c may be provided on the lower surface of the light reflecting plate 11 of the movable section 18.

The optical scanner 1 of the embodiment rotates the light reflecting plate 11 around two orthogonal axes of the X axis and the Y axis, but this is not limitative. The optical scanner 1 may rotate the light reflecting plate 11 around any one of the X axis and the Y axis.

Since the optical scanner 1 as described above includes the light reflecting section 12, the optical scanner 1 may be suitably applied to an optical scanner that is provided in an image forming apparatus such as a display for imaging, such as a laser printer, a barcode reader, a scanning confocal laser microscopy, a projector, a head up display (HUD) or a head mounted display (HMD), for example.

Embodiment of Image Forming Apparatus

Figure 9:
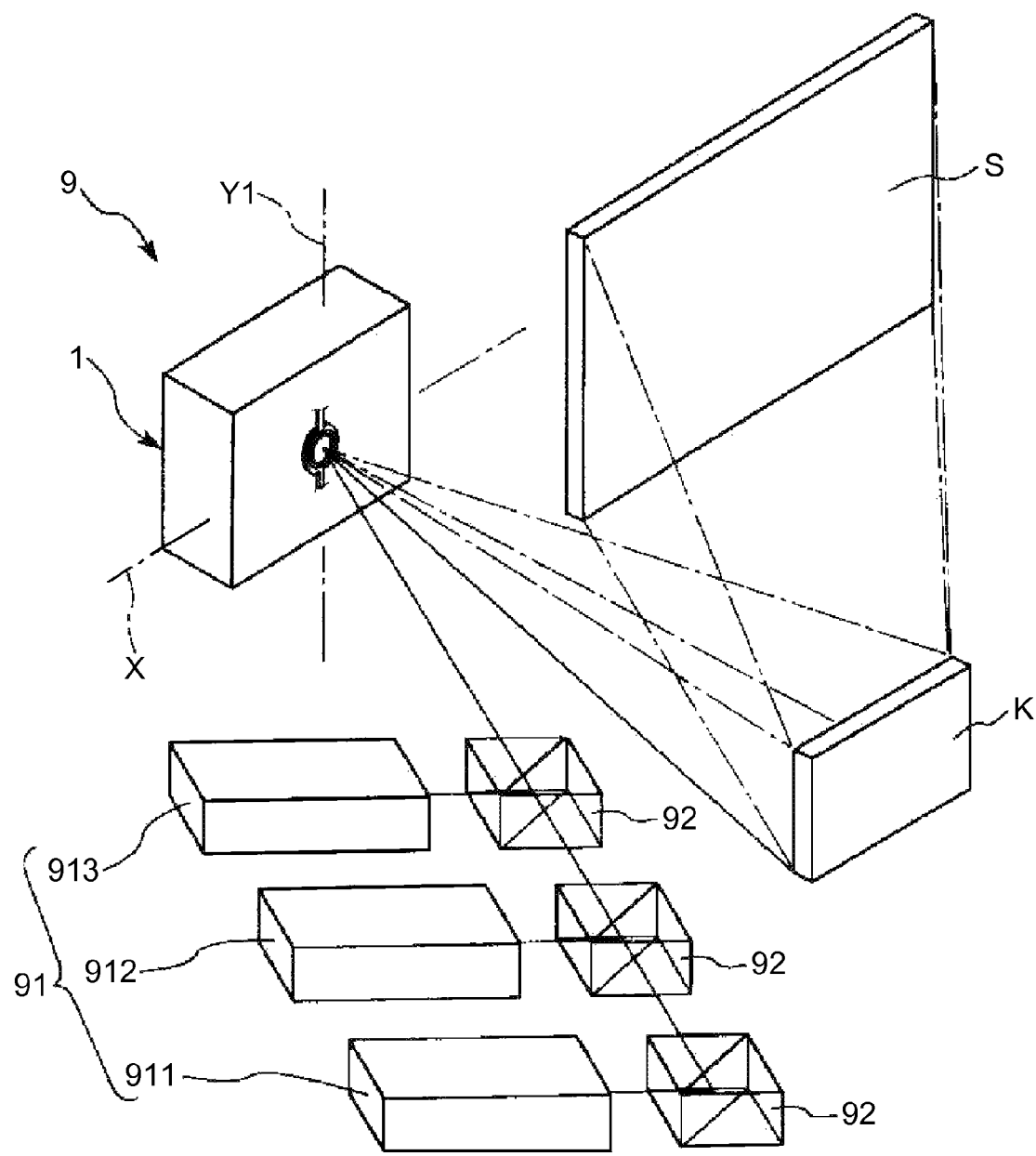
FIG. 9 is a diagram schematically illustrating an embodiment of an image forming apparatus according to the invention.

FIG. 9 is a diagram schematically illustrating an embodiment of an image forming apparatus of the invention.

In the embodiment, as an example of an image forming apparatus, a case where the optical scanner 1 is used as an optical scanner of a display for imaging will be described. Here, the length direction of a screen S is referred to as a "transverse direction", the direction perpendicular to the length direction is referred to as a "longitudinal direction". Further, the X axis, that is, the rotation center axis X is parallel to the transverse direction of the screen S, and the Y axis, that is, the rotation center axis Y is parallel to the longitudinal direction of the screen S.

An image forming apparatus (projector) 9 includes a light source device (light source) 91 that emits light such as laser, a plurality of dichroic mirrors 92, 92 and 92, and the optical scanner 1.

The light source device 91 includes a red light source device 911 that emits red light, a blue light source device 912 that emits blue light, and a green light source device 913 that emits green light.

Each dichroic mirror 92 is an optical element that composes light emitted from each of the red light source device 911, the blue light source device 912 and the green light source device 913.

Such a projector 9 is configured so that the light emitted from the light source device 91 (the red light source device 911, the blue light source device 912 and the green light source device 913) is composed by the dichroic mirrors 92 and the composed light is two-dimensionally scanned by the optical scanner 1 to form a color image on the screen S, based on image information from a host computer (not illustrated).

In the two-dimensional scanning, the light reflected from the light reflecting section 12 is scanned in the transverse direction of the screen S (main scanning) by rotation of the light reflecting plate 11 of the optical scanner 1 around the rotation center axis Y. On the other hand, the light reflected from the light reflecting section 12 is scanned in the longitudinal direction of the screen S by rotation of the light reflecting plate 11 of the optical scanner 1 around the rotation center axis X (sub scanning).

In FIG. 9, the light composed by the dichroic mirrors 92 is two-dimensionally scanned by the optical scanner 1 and is then reflected from a fixed mirror K to form an image on the screen S. However, the fixed mirror K may be removed, and the light two-dimensionally scanned by the optical scanner 1 may be directly irradiated onto the screen S.

Hereinafter, application examples of an image forming apparatus will be described.

Application Example 1 of Image Forming Apparatus

Figure 10:
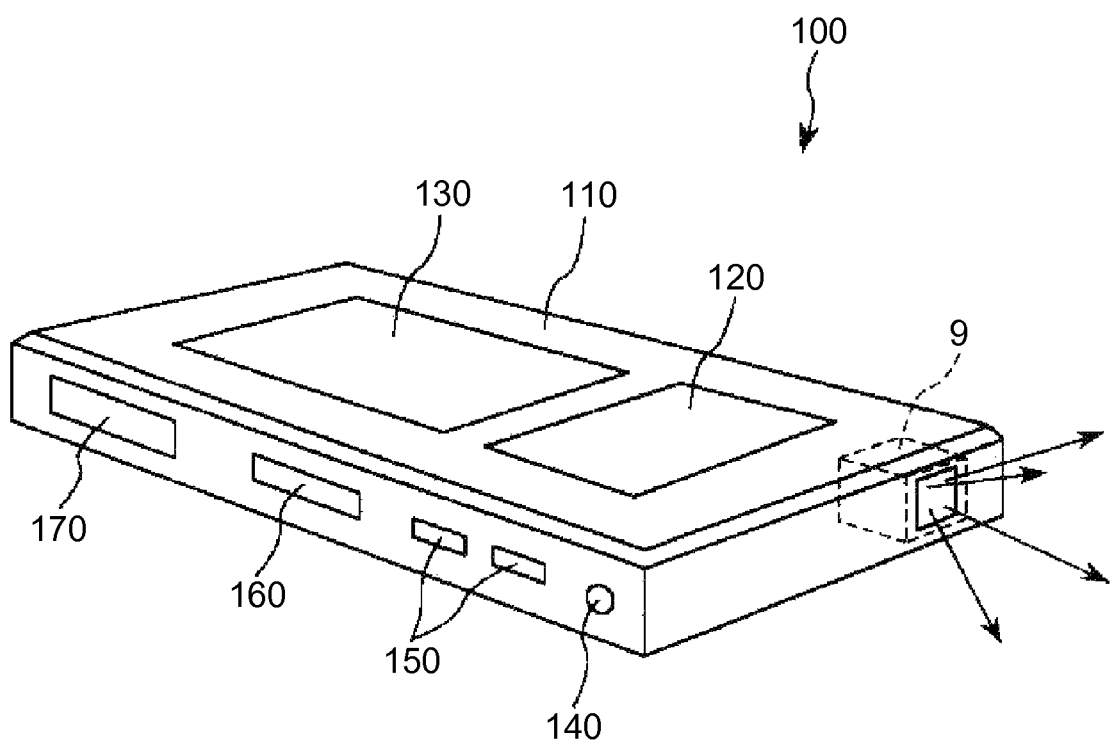
FIG. 10 is a perspective view illustrating Application Example 1 of an image forming apparatus according to the invention.

FIG. 10 is a diagram illustrating Application Example 1 of an image forming apparatus of the invention.

As shown in FIG. 10, the image forming apparatus 9 may be applied to a portable image forming apparatus 100.

The portable image forming apparatus 100 has a size capable of being held by the hand, and includes a casing 110 and the image forming apparatus 9 built-in the casing 110. Using the portable image forming apparatus 100, it is possible to display a predetermined image on a predetermined surface, for example, on a screen or a desk.

Further, the portable image forming apparatus 100 includes a display 120 that displays predetermined information, a key pad 130, an audio port 140, control buttons 150, a card slot 160, and an AV port 170.

Further, the portable image forming apparatus 100 may have other functions such as a telephone function or a GSP reception function.

Application Example 2 of Image Forming Apparatus

Figure 11:
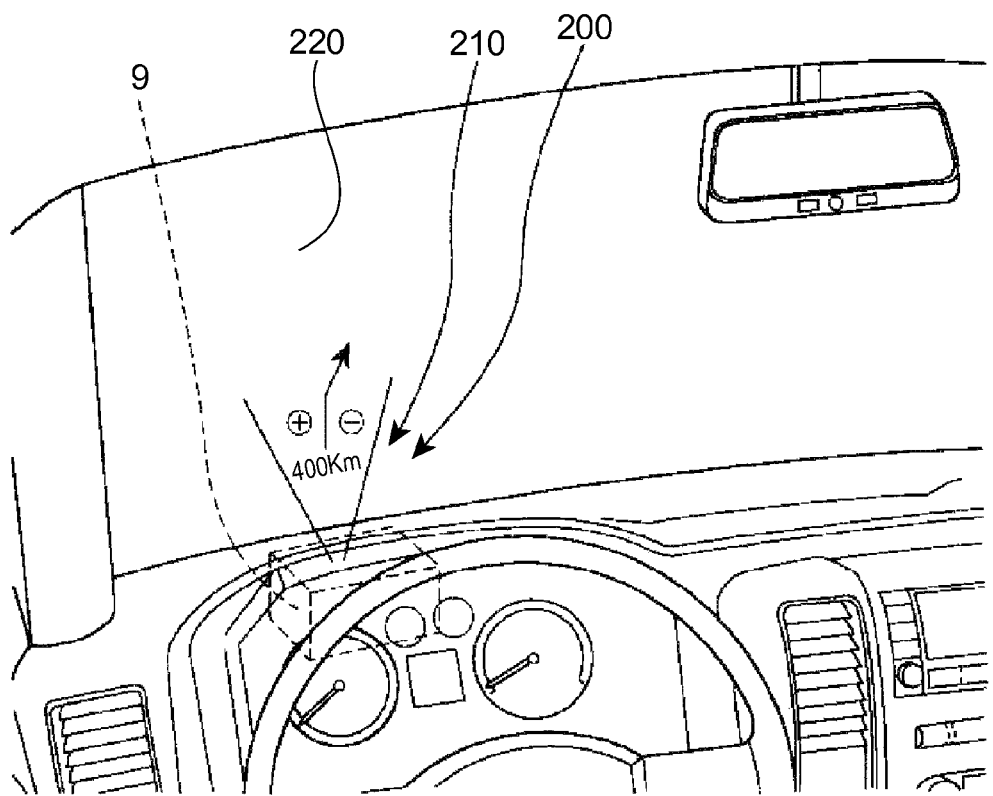
FIG. 11 is a perspective view illustrating Application Example 2 of an image forming apparatus according to the invention.

FIG. 11 is a perspective view illustrating Application Example 2 of an image forming apparatus of the invention.

As shown in FIG. 11, the image forming apparatus 9 may be applied to a head up display system 200.

In the head up display system 200, the image forming apparatus 9 is mounted in a dashboard of a vehicle to form a head up display 210. Using the head up display 210, it is possible to display a predetermined image such as a guide display up to a destination on a front glass 220, for example.

The head up display system 200 may also be applied to airplanes, ships or the like, for example, as well as vehicles.

Application Example 3 of Image Forming Apparatus

Figure 12:
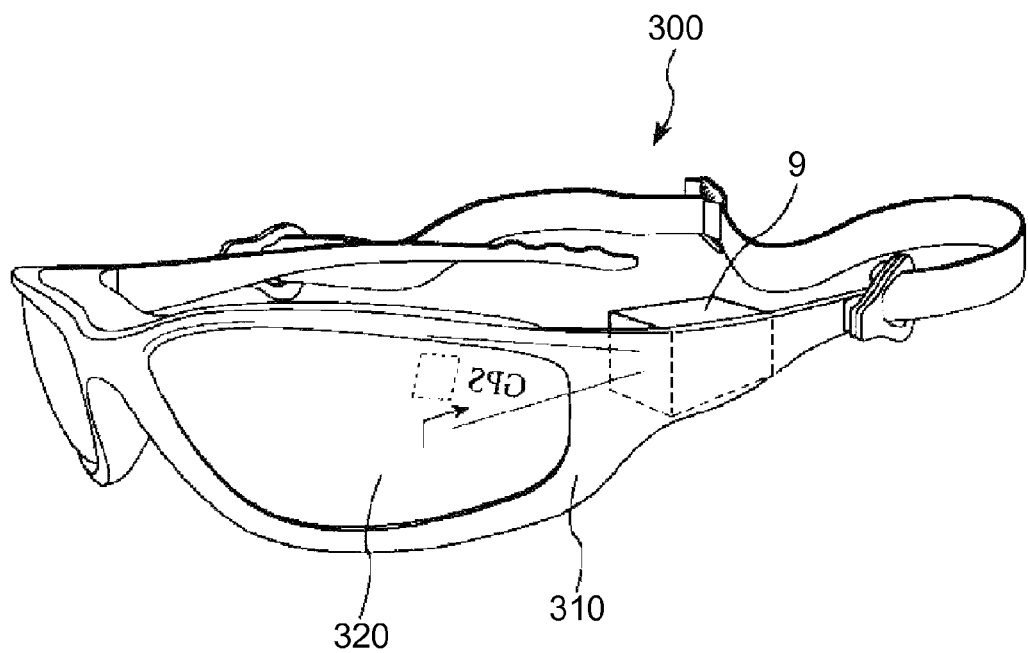
FIG. 12 is a perspective view illustrating Application Example 3 of an image forming apparatus according to the invention.

FIG. 12 is a perspective view illustrating Application Example 3 of an image forming apparatus of the invention.

As shown in FIG. 12, the image forming apparatus 9 may be applied to a head mounted display 300.

That is, the head mounted display 300 includes glasses 310, and the image forming apparatus 9 mounted in the glasses 310. Further, a predetermined image to be viewed by one eye is displayed on a display section 320 provided in an original lens portion of the glasses 310, by the image forming apparatus 9.

The display section 320 may be transparent, or may be not transparent. In a case where the display section 320 is transparent, it is possible to add information from the image forming apparatus 9 to information from the real world for use.

Two image forming apparatuses 9 may be provided in the head mounted display 300, and image to be viewed by two eyes may be displayed on two display sections.

Hereinbefore, the optical scanner and the image forming apparatus of the invention have been described on the basis of the illustrated embodiments, but the invention is not limited thereto. For example, in the optical scanner and the image forming apparatus of the invention, the configuration of each section may be replaced with an arbitrary configuration having the same function, and a different arbitrary configuration may be added thereto.

Further, the invention may have a configuration obtained by combining two or more arbitrary configurations (features) of the above-described embodiments.

The entire disclosure of Japanese Patent Application No. 2012-095096, filed Apr. 18, 2012 is expressly incorporated by reference herein.

What is claimed is:

1. An optical scanner comprising:
    a movable body that is able to oscillate around a first axis;
    a first shaft member that is connected to an end part of the movable body in a direction along the first axis
    a support member that supports the movable body and surrounds the movable body on all sides in a plan view; and
    a drive unit that includes a permanent magnet, a coil that generates a magnetic field by application of voltage, and a voltage applying section that oscillates the movable body around the first axis,
    wherein the movable body includes
        a light reflecting plate provided with a light reflecting section having light reflectivity,
        a support frame that surrounds the light reflecting plate on all sides in a plan view, and has a thickness that is, ten times or less, larger than the thickness of the light reflecting plate, and
        a plurality of connecting sections that connects the light reflecting plate and the support frame at a plurality of locations,
    wherein the light reflecting plate, the support frame, and the plurality of connecting sections are each a portion of the movable body and are movable.

2. The optical scanner according to claim 1,
wherein the thickness of the support frame is, two times or more, larger than the thickness of the light reflecting plate.

3. The optical scanner according to claim 1,
wherein the support frame is configured by a stacked structure obtained by sequentially stacking a first Si layer, an $SiO_2$ layer and a second Si layer.

4. The optical scanner according to claim 1,
wherein the light reflecting plate has a configuration in which the light reflecting section is provided on a Si layer.

5. The optical scanner according to claim 1,
wherein the movable body includes
    a frame-shaped member;
    a movable section that is provided inside the frame-shaped member, includes the light reflecting plate, the support frame and the respective connecting sections, and is able to oscillate around a second axis perpendicular to the first axis; and
    a second shaft member that is connected to an end part of the movable section in a direction along the second axis and connects the movable section and the frame-shaped member,
wherein the first shaft member is connected to an end part of the frame-shaped member in the direction along the first axis so that the frame-shaped member is able to oscillate around the first axis, and
wherein the voltage applying section includes a first voltage generating section that generates a first voltage of a first frequency, a second voltage generating section that generates a second voltage of a second frequency different from the first frequency, and a voltage overlapping section that overlaps the first voltage and the second voltage, and as a voltage overlapped by the voltage overlapping section is applied to the coil, the movable section oscillates around the first axis at the first frequency and oscillates around the second axis at the second frequency.

6. The optical scanner according to claim 1,
wherein the permanent magnet is disposed in the movable body.

7. The optical scanner according to claim 6,
wherein the permanent magnet is disposed in the support frame.

8. The optical scanner according to claim 1,
wherein the coil is disposed in the movable body.

9. The optical scanner according to claim 8, wherein the coil is disposed in the support frame.

10. The optical scanner according to claim 5, wherein the coil is disposed in the frame-shaped member.

11. An image forming apparatus comprising:
a light source that emits light; and
an optical scanner that scans the light from the light source,
wherein the optical scanner includes
a movable body that is able to oscillate around an axis;
a shaft member that is connected to an end part of the movable body in a direction along the axis;
a support member that supports the movable body and surrounds the movable body on all sides in a plan view; and
a drive unit that includes a permanent magnet, a coil that generates a magnetic field by application of voltage, and a voltage applying section that applies a voltage to the coil and oscillates the movable body around the axis,
wherein the movable body includes
a light reflecting plate provided with a light reflecting section having light reflectivity,
a support frame that surrounds the light reflecting plate on all sides in a plan view and has a thickness that is, ten times or less, larger than the thickness of the light reflecting plate, and
a plurality of connecting sections that connects the light reflecting plate and the support frame at a plurality of locations,
wherein the light reflecting plate, the support frame, and the plurality of connecting sections are each a portion of the movable body and are movable, and
wherein as the voltage applying section applies a voltage of a predetermined frequency to the coil, the movable body oscillates around the axis at the predetermined frequency.

12. An optical scanner comprising:
a movable body that is able to oscillate around a first axis;
a first shaft member that is connected to an end part of the movable body in a direction along the first axis;
a frame shaped member that supports the movable body and surrounds the movable body on all sides in a plan view, the first shaft member connecting the movable body to the frame shaped member;
a support member that supports the frame shaped member and surrounds the frame shaped member on all sides in a plan view, the frame shaped member being connected to the support member by a second shaft member extending along a second axis orthogonal to the first axis; and
a drive unit that includes a permanent magnet, a coil that generates a magnetic field by application of voltage, and a voltage applying section that oscillates the movable body around the first axis,
wherein the movable body includes
a light reflecting plate provided with a light reflecting section having light reflectivity,
a support frame that surrounds the light reflecting plate on all sides in a plan view, and has a thickness that is, ten times or less, larger than the thickness of the light reflecting plate, and
a plurality of connecting sections that connects the light reflecting plate and the support frame at a plurality of locations,
wherein the light reflecting plate, the support frame, and the plurality of connecting sections are each a portion of the movable body and are movable.

13. The optical scanner according to claim 12, further comprising a permanent magnet disposed at least within an inner circumference of the support frame and having a longitudinal axis that is inclined with respect to the first axis.

14. An optical scanner comprising:
a movable body that is able to oscillate around a first axis;
a first shaft member that is connected to an end part of the movable body in a direction along the first axis;
a support member that supports the movable body and surrounds the movable body on all sides in a plan view; and
a drive unit that includes a permanent magnet, a coil that generates a magnetic field by application of voltage, and a voltage applying section that oscillates the movable body around the first axis,
wherein the movable body includes
a light reflecting plate provided with a light reflecting section having light reflectivity,
a support frame that surrounds the light reflecting plate on all sides in a plan view, and has a thickness that is, ten times or less, larger than the thickness of the light reflecting plate, wherein the support frame is connected to the first shaft member, and
a plurality of connecting sections that connects the light reflecting plate and the support frame at a plurality of locations,
wherein the light reflecting plate, the support frame, and the plurality of connecting sections are each a portion of the movable body and are movable,
wherein a surface of a side of the light reflecting section in a thickness direction of the support frame is on the same plane as a surface of the light reflecting plate forming the light reflecting section, and
wherein the support frame protrudes in a direction opposite to a direction that the light reflecting section protrudes from the light reflecting plate.

* * * * *